Patented June 17, 1930

1,763,781

UNITED STATES PATENT OFFICE

SHELDON B. HEATH AND MERLIN O. KELLER, OF MIDLAND, MICHIGAN, ASSIGNORS TO THE DOW CHEMICAL COMPANY, OF MIDLAND, MICHIGAN, A CORPORATION OF MICHIGAN

METHOD OF MAKING CUPROUS COMPOUNDS

No Drawing. Application filed February 4, 1928. Serial No. 252,034.

This invention relates to a method of producing cuprous compounds.

In the production of cuprous compounds, heretofore, there has remained present after the reaction a substantial percentage of cupric compounds, necessitating further treatment for their removal or else impairing the value of the cuprous product.

The main object of the present invention, therefore, is to provide a method of producing cuprous compounds wherein substantially all of the cupric compounds will be reduced.

Another object is to provide a method of obtaining cuprous compounds without the employment of external heat during any of the steps of the method.

Additional objects and advantages will be seen in the method as the description of a specific embodiment thereof progresses.

It is well known that ammonia may be decomposed in the presence of chlorine with a resultant formation of nitrogen, also that chlorine when bubbled into an aqueous $NH_4Cl$ solution produces under some conditions an explosive nitrogen chloride. Another well known fact is that the presence of ammonium salts will increase the conversion of cupric compounds into cuprous compounds. In developing the method of the invention, it was found that when chlorine is bubbled through a solution containing cupric, cuprous, and ammonium chlorides, in the presence of a large area of metallic copper surface the ammonia salt is not decomposed, the chlorine is absorbed more rapidly and completely than when the ammonium salt is not present, and that while the chlorine is being absorbed at a rapid rate, the copper is being dissolved at a corresponding rate such that approximately 80% of the copper dissolved in the solution is in the cuprous condition. When the addition of the chlorine is stopped copper continues to be dissolved till upwards of 98+% of the copper content of the solution may be had in the cuprous condition.

The reactions involved may be expressed by the following equations:

1. $Cu + Cl_2 \rightarrow CuCl_2$
2. $CuCl_2 + Cu \rightleftharpoons 2CuCl$

Equation 1 proceeds normally in the direction indicated by the arrow as long as a supply of chlorine is maintained. In equation 2, as signified by the oppositely directed arrows, a condition of equilibrium exists which, in the absence of an ammonium salt, is satisfied within a temperature range up to the boiling point of the solution when a considerable percentage of cupric chloride still remains in the solution. The effect of the ammonium salt is apparently to displace the equilibrium in the direction to the right.

We have found that if the molecular ratio of the ammonium salt to the cuprous salt in the final solution is approximately 1 to 1, substantially 100% of the copper will be finally present in the cuprous condition. A greater ratio of ammonia to copper is not detrimental but is unnecessary. The proportions stated are sufficient to push the equilibrium of the reaction towards the cuprous side sufficiently for the purposes of the process. It will be apparent that the copper is dissolved in the solution in quantity necessary to carry out the reactions in conformity with the foregoing equations. The possibility of a secondary reaction also is present as expressed by equation 3;

3. $2CuCl + Cl_2 \rightarrow 2CuCl_2$

However, it is our belief that this latter reaction, if it takes place, is not a determining factor in the process which, at least as regards the initial and final stages thereof, is sufficiently set forth by equations 1 and 2.

In order to describe our improved method, the production of cuprous chloride solution and therefrom cuprous hydroxide will be specifically set forth, utilizing as raw materials copper and chlorine and as ammonium salt ammonium chloride.

It should be understood, however, that the method is not limited to such specific procedure or materials but that copper oxide or copper sulphate or other copper compound may be used as a source of at least a portion of the copper used, and other ammonium salts may be used such as ammonium sulphate, and that the cuprous solution obtained may be a solution of cuprous chloride or a mixture of cuprous salts from which also the hydroxide may be precipitated as described for the cuprous chloride solution.

In carrying out the method, it is contemplated to pass chlorine gas through a water solution containing cuprous chloride, cupric chloride and ammonium chloride in the presence of a large area of metallic copper surface. This copper surface may be furnished by scrap copper wire or any other form of metallic copper that presents a large surface per unit weight. The copper, because of large surface available, reduces quickly the cupric salts formed and allows of the rapid introduction of the chlorine gas which reacts with the copper to form more cupric chloride for cyclic reduction.

The heat of the above reactions finally raises the temperature of the solution to the boiling point. When the concentration is sufficiently high, the addition of the chlorine gas is stopped. The solution is then allowed to stand hot in the presence of metallic copper until its copper content tests 98+% as cuprous copper, the molecular ratio of ammonium chloride to cuprous copper being maintained approximately at or preferably above, one to one, or unity, in the final solution.

When once the process has been put into operation a portion of the cuprous solution obtained is retained in the reaction vessel as the nucleus or starting point of a further production and to this is added more copper, more chlorine and enough ammonium salt to keep up the concentration in desirable molecular ratio. Starting originally it will be necessary to produce first a solution of a copper salt such as would be obtained for instance by reacting upon copper or copper oxide with hydrochloric or sulfuric acid to form an initially cupric solution which in the presence of metallic copper would be reduced in part to the cuprous state and would then form a nucleus suited to introduction of chlorine and ammonium salt. It is necessary to avoid the introduction of chlorine into a solution not strongly cuprous so as to avoid decomposition of the ammonia by the chlorine.

This condition restricts the rate at which chlorine may be introduced until with rise of temperature the rate of reduction of cupric copper in solution increases when the rate of introduction of chlorine may be likewise increased to keep the rate of oxidation of cuprous salt by the chlorine approximately equal but not on the average in excess of the rate of reduction.

When copper sulphate and ammonium sulphate are present in aqueous solution in the ratio of one mole of copper sulphate to one mole of ammonium sulphate and in the presence of a large area of copper surface at temperature of the atmospheric boiling point of the solution, it has been found that of the total copper present in solution there is only about 11% in cuprous condition. If sodium chloride molecularly equivalent to the sulphate in solution is added under the same conditions, all of the copper in solution will be found as cuprous. Other alkaline and alkaline earth chlorides may be used instead of sodium chloride. In other words, the reduction of a cupric to the corresponding cuprous salt by the action of metallic copper, as previously described with reference to the chlorides, apparently does not take place to the same extent with other copper salts such as the sulphate, even in the presence of the ammonium compound containing the same acid radical. By introducing an equivalent concentration of chloride ions into the solution, however, as by the addition of sodium chloride, the reduction may be caused to proceed as hereinbefore described. The simultaneous introduction of chlorine establishes the requisite condition for the continued production of a cupric salt, probably cupric chloride, which in turn is reduced to the cuprous condition by the action of the metallic copper present.

However the start may have been made is immaterial since after the process is once in effect enough of the reacting batch is retained in the reactor to keep it going and by addition of water, copper, ammonium salt and chlorine the excess of hot solution may be run off and the process in the reactor may then be carried out continuously if desired. It will, of course, under those conditions be necessary to run the liquor out of the reactor into a suitable vessel in which there is a sufficient quantity of copper surface available to convert the cupric salts present to cuprous.

The final solution may contain approximately 30 lbs. of copper in the form of cuprous chloride per cubic foot, and from 25 lbs. to 30 lbs. of ammonium chloride per cubic foot. The solution may be immediately used as prepared if suited to the use intended or if cuprous hydroxide is desired it may be precipitated from the solution by adding a suitable alkali such as caustic soda, the same being added in amount sufficient to liberate the ammonia and precipitate the copper. The solution may, however, be left or stored in the reaction or other vessel out of contact with air and to avoid the precipitation of salts upon cooling to a supersaturated condition water may be added. Upon cooling the strong hot solution a crust will form over the surface which will protect the solution below it with more or less completeness from oxidation by air.

If the cuprous solution obtained above is not suited to the use for which it is intended and an isolated cuprous compound is required, we precipitate the copper as cuprous hydroxide by adding a suitable alkali as above described in amount sufficient to liberate the ammonia and precipitate the copper. Lime may be used at least in part but a complete precipitation will require caustic alkali. The ammonia may then be distilled off and the hydroxide separated from the solution and used as such or as a source of such cuprous salt as it may be desired to produce. The liberated ammonia may be absorbed for reuse in the reaction step if desired.

As set forth above, the present method does not require the use of external heat in any of its steps, since the reaction is exothermic and so rapid that the heat produced is sufficient to bring the solution to boiling and then complete the production of a strong cuprous salt solution. Because of this the method may be carried out in stone-ware, in a brick or tile lined metal tank, or in any resistant vessel without providing means for the introduction therein of heating coils or the conduction of any heat through the walls of the container. This feature is most important since the materials of the solution are corrosively active to most materials except stone-ware or glass, which are both poor conductors of heat and do not lend themselves to constructions in which heat has to be supplied.

As previously pointed out, the method has been described with reference to the production of a solution of cuprous chloride and ammonium chloride, although other salts of ammonia and copper will function. For example, the process may start with copper in the form of sulphate, but since the cost of a unit of copper in the form of copper sulphate is more than the cost per unit in scrap copper, the use of such alternative is not economically desirable at the present time. Again, copper oxides or mixtures of copper oxides could be used as the source of a portion of the copper in the process, but this use would still necessitate the use of a large amount of metallic copper surface at the end of the reaction to insure a complete reduction of the cupric copper.

The process has been described as using chlorine, it being usually the cheaper halogen, but other halogens, such as bromine, might be used. The invention is to be understood as limited only by the scope of the following claims and not by any specific description herein contained.

Having thus described our invention what we claim is:

1. The method of producing cuprous compounds which comprises reacting with a free halogen on a solution of a cupric salt, an ammonium salt and a halide in the presence of copper.

2. The method of producing cuprous compounds which comprises reacting with a free halogen on a solution of a cupric salt and a halide in the presence of copper and an ammonium salt having a molecular concentration at least as great as the cuprous salt produced.

3. The method of producing cuprous compounds which comprises reacting with free chlorine on a solution of a cupric salt, an ammonium salt and a chloride in the presence of metallic copper.

4. The method of producing cuprous compounds by passing a free halogen into a solution of cupric and ammonium salts in the presence of copper and a halide until the heat of reaction brings the solution to boiling, and then maintaining the solution in contact with copper to complete the reduction of the dissolved copper to the cuprous state.

5. The method of producing cuprous compounds which comprises adding a free halogen to a solution of cuprous, cupric, and ammonium salts in the presence of a halide and metallic copper.

6. The method of producing cuprous compounds comprising adding a free halogen to a solution of cuprous, cupric, and ammonium salts in the presence of a halide and metallic copper, the molecular ratio of ammonium salt to cuprous salt in solution being at least equal to unity.

7. The method of producing cuprous compounds comprising passing chlorine through a solution of cuprous, cupric, and ammonium salts in the presence of a chloride and metallic copper.

8. The method of producing cuprous compounds comprising passing chlorine through a solution of cuprous, cupric, and ammonium salts in the presence of a chloride and metallic copper, the molecular ratio of ammonium salt to cuprous salt in solution being at least equal to unity.

9. The method of producing cuprous compounds comprising adding a free halogen to a solution of cuprous, cupric, and ammonium salts in the presence of a halide and metallic copper, the latter having a large surface per unit weight.

10. The method of producing cuprous compounds comprising adding a free halogen to a solution of cuprous, cupric, and ammonium salts in the presence of a halide and metallic copper, stopping the addition of the halogen when the resultant reaction causes the solution to boil, allowing the solution to react thus with the metallic copper therein until substantially 98+% of the copper is converted to the cuprous state, the molecular ratio of the ammonium salt to the cuprous salt being maintained at least equal to unity, then cooling the solution.

11. The method of producing cuprous hydroxide comprising adding a free halogen to a solution of cuprous, cupric, and ammonium salts in the presence of a halide and metallic copper, and then adding an alkali.

12. The method of producing cuprous hydroxide comprising adding a free halogen to a solution of cuprous, cupric, and ammonium salts in the presence of a halide and metallic copper, the latter having a large surface per unit weight, and then adding an alkali.

13. The method of producing cuprous hydroxide comprising adding a free halogen to a solution of cuprous, cupric, and ammonium salts in the presence of a halide and metallic copper, maintaining the molecular ratio of ammonium salt to cuprous salt in solution at least equal to unity, and adding an alkali.

14. The method of producing cuprous hydroxide comprising adding chlorine into a solution of cuprous, cupric, and ammonium chlorides in the presence of metallic copper, and adding an alkali.

15. The method of producing cuprous chloride comprising adding chlorine into a solution of cuprous, cupric, and ammonium chlorides in the presence of metallic copper having large surface per unit weight.

16. The method of producing cuprous chloride which comprises adding chlorine to a solution of cuprous, cupric and ammonium chlorides in the presence of metallic copper.

17. The method of producing cuprous chloride which comprises adding chlorine to a solution of cuprous, cupric and ammonium chlorides in the presence of metallic copper, the molecular ratio of ammonium chloride to cuprous chloride being maintained at least equal to unity.

In testimony whereof, we hereunto affix our signatures.

SHELDON B. HEATH.
MERLIN O. KELLER.